United States Patent
Yu et al.

(10) Patent No.: US 9,751,965 B2
(45) Date of Patent: Sep. 5, 2017

(54) METHODS FOR PREPARATION OF PROPYLENE POLYMERS

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Luqiang Yu, Beijing (CN); Zhichao Yang, Beijing (CN); Jiangbo Chen, Beijing (CN); Jianxin Zhang, Beijing (CN); Yafeng Du, Beijing (CN); Qinyu Tong, Beijing (CN); Kang Sun, Beijing (CN); Yang Liu, Beijing (CN); Jie Zou, Beijing (CN); Lusheng Wang, Beijing (CN); Zengyue Dai, Beijing (CN); Zhong Tan, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 388 days.

(21) Appl. No.: 14/067,289

(22) Filed: Oct. 30, 2013

(65) Prior Publication Data

US 2014/0121337 A1 May 1, 2014

(30) Foreign Application Priority Data

Oct. 30, 2012 (CN) .......................... 2012 1 0425055
Oct. 30, 2012 (CN) .......................... 2012 1 0425478

(51) Int. Cl.
*C08F 210/06* (2006.01)

(52) U.S. Cl.
CPC ................................. *C08F 210/06* (2013.01)

(58) Field of Classification Search
None
See application file for complete search history.

(56) References Cited

U.S. PATENT DOCUMENTS

| | | | | |
|---|---|---|---|---|
| 4,129,701 A * | 12/1978 | Jezl | ....................... | B01J 8/1836 526/352 |
| 4,308,357 A * | 12/1981 | Kaus | .................. | C08F 297/083 525/247 |
| 4,784,983 A * | 11/1988 | Mao | ....................... | C08F 10/00 502/104 |
| 6,350,054 B1 * | 2/2002 | Lee | .......................... | B01F 7/04 366/325.92 |
| 2009/0209706 A1 * | 8/2009 | Sheard | ................... | B01J 8/1809 525/240 |
| 2013/0196847 A1 | 8/2013 | Tan et al. | | |

FOREIGN PATENT DOCUMENTS

| | | | | |
|---|---|---|---|---|
| CN | 1421468 A | 6/2003 | | |
| DE | EP 0584586 A2 * | 3/1994 | ............. | C08F 10/06 |
| EP | 0 517 183 A2 | 12/1992 | | |
| EP | 1 632 529 A1 | 3/2006 | | |
| EP | 2 145 923 A1 | 1/2010 | | |
| IT | WO 2008015113 A2 * | 2/2008 | ............ | C08F 210/06 |
| JP | 07-247311 | 9/1995 | | |
| JP | 2001-114813 | 4/2001 | | |
| JP | 2001-114848 | 4/2001 | | |
| JP | 2003-268060 | 9/2003 | | |
| JP | 2008-150466 | 7/2008 | | |
| WO | WO 2008/015113 A2 | 2/2008 | | |
| WO | WO 2012/034357 | 3/2012 | | |

OTHER PUBLICATIONS

Abedi et al., "Effect of Polymerization Time on the Molecular Weight and Molecular Weight Distribution of Polypropylene," J. Appl. Polym. Sci., vol. 100, 368-371 (2006).*
Machine translation of EP 0587586A2.*

* cited by examiner

*Primary Examiner* — Catherine S Branch
(74) *Attorney, Agent, or Firm* — Finnegan, Henderson, Farabow, Garrett & Dunner LLP

(57) ABSTRACT

Disclosed herein is a polymerization method of propylene, which can prepare a propylene homopolymer with both high fluidity and high rigidity as well as a propylene/α-define copolymer having both high fluidity and a good rigidity-toughness balance by, for example, control of polymerization steps and elevation of polymerization temperature, while the catalyst still maintains a relatively high polymerization activity.

21 Claims, No Drawings

METHODS FOR PREPARATION OF PROPYLENE POLYMERS

The present disclosure relates to a method for preparation of a propylene polymer, more particularly, relates to a method for preparation of a propylene homopolymer having high melt index and high rigidity as well as a propylene/α-olefine copolymer having both high melt index and a good rigidity-toughness balance.

Most of propylene polymer products can be used for injection molding articles, and widely applied in many fields such as package, transportation, domestic appliances, automobiles, office supplies, daily necessities and medical articles. There are two trends for development of high performance propylene polymer products. The first trend is to increase melt flow rate (MFR, also referred as melt flow index (MFI)) of polymer, which may help to shorten molding period, reduce energy consumption, and make large thin-wall articles. At present, injection productions with MFR of 10-15 g/10 min are gradually replaced with products with MFR of 25-35 g/10 min. The second trend is to seek the balance between rigidity and impact strength of propylene polymers, so as to meet the requirements on impact strength of propylene copolymers while improving rigidity, and thereby the thickness of product can be reduced and the production cost of articles can be also decreased. Since propylene polymers with high melt flow rate can shorten molding period, reduce energy consumption, meet the requirements on impact resistance and increase the rigidity of propylene polymers, such propylene polymers with high melt flow rate have predominant advantages in increase of product output, decrease of product cost and manufacture of large complicated thin-wall articles.

The following methods are usually used to increase MFR of propylene polymers:

(1) Using catalyst system sensitive to molecular weight regulation in polymerization process. By selectively combining different catalysts, cocatalysts and external electron donors, the polymerization catalyst system becomes more sensitive to the molecular weight regulator (e.g., hydrogen gas that is the commonest molecular weight regulator), so that polymer products with high MFR can be obtained in the presence of small amount of hydrogen gas.

(2) Adding into the polymer a degradation agent after the polymerization. Usually are added one or more peroxides, so that polymer chains in the polymer are broken under certain conditions to increase MFR of the product. This technique is generally referred as controlled rheology technology.

At present, many devices for production of polypropylene use the increased amount of hydrogen gas to produce propylene copolymer products with high MFR, but the amount of added hydrogen gas is limited due to the limitation of pressure design of devices, as is the case with the present liquid phase bulk polymerization process of propylene. The addition of a large amount of hydrogen gas may result in the following defects: a significant decrease of catalyst activity; a decrease of isotacticity of polymers, resulting in the decrease of rigidity of final polypropylene articles; and in addition, the existence of a large amount of hydrogen gas, which is a non-condensable gas, deteriorates heat transfer effect of heat exchange of the system, so that the production load of device is directly influenced and thus the production output decreases. There are also some methods, in which the amount of the hydrogen gas used is reduced by selecting a combination of different catalysts, cocatalyst and external electron donors, for example, the method as described in CN101270172A. The method disclosed by CN101270172A can improve hydrogen-regulation sensitivity of propylene polymerization and render the isotacticity and MFR of the obtained polypropylene adjustable within a relatively broad range, but the use of hydrogen-regulation sensitive catalyst may usually result in the decrease of isotacticity and the deterioration of rigidity-toughness balance of final product.

The current polymerization processes can hardly give consideration to the requirements on polymerization activity, hydrogen-regulation sensitivity, and high isotacticity and high melt flow rate of propylene polymers. In order to meet the requirements on isotacticity and high melt flow rate of polypropylene products, propylene copolymers with high MFR are usually produced by controlled rheology technology, i.e., by using a method of adding a small amount of peroxide degradation agents to obtain propylene copolymers with high melt index. Due to the degradation of products caused by peroxide, polypropylene articles usually smell unpleasant and thus their applications are significantly limited.

It is well known that in olefin polymerization processes, Ziegler-Natta catalysts have many advantages with the elevation of olefin polymerization temperature. For example, as for the propylene polymerization, with the elevation of polymerization temperature, catalysts become more sensitive to molecular weight regulator (e.g., hydrogen gas), so that polymers with small molecular weight can be generated even in the presence of a very small amount of hydrogen gas, as is very favorable to the production of polypropylene products with high melt index. In addition, with the elevation of polymerization temperature, the isotacticity of the generated polypropylene is also improved, as is very favorable to the production of propylene homopolymer product with high rigidity and propylene copolymer with good balanced rigidity-toughness properties. At present, an amount of nucleating agent is usually required to improve the rigidity of polymer products, which may result in the increase of production cost. Hence, it is an ideal option to improve the quality of polypropylene products by elevating polymerization temperature.

For example, the Chinese Patent CN100457790C discloses a polymerization process, which comprises the following three-stage polymerization: (1) pre-polymerization of propylene, (2) low-temperature polymerization, and (3) high-temperature polymerization. In this process, the polymerization temperature is gradually elevated and the proportion of polymers in each polymerization stage is controlled so as to obtain propylene polymers with high flexural modules and high bending strength. However, since the use of low-temperature polymerization in step (2) consumes most of polymerization activity of the catalyst, the improvement for the polymer properties that should be brought out by high-temperature polymerization is not fully achieved.

In addition, the conventional Ziegler-Natty catalysts have limitations in adaption to polymerization temperature. Generally speaking, when the polymerization temperature exceeds 85° C., the catalyst activity usually declines quickly if no treatment is applied. For example, when the polymerization temperature is higher than 100° C., the polymerization activity usually declines so low as to render the process worthless in the industrial application.

In sum, there is still no propylene polymerization process and corresponding catalyst which can meet the requirements on polymerization activity, high isotacticity of polymers, and improved hydrogen-regulation property so that propylene polymers with high fluidity and high rigidity can be prepared while the catalyst still maintains high polymerization activity.

To overcome the drawbacks in the prior art that the requirements on polymerization activity, hydrogen-regulation sensitivity and melt flow index, rigidity and impact resistance cannot be met simultaneously when producing propylene polymers having high melt flow rate, disclosed herein is a method for preparing propylene polymers that can give consideration to all these requirements.

Disclosed herein is a method for preparing propylene polymers, comprising:

(1) performing pre-polymerization of propylene or an olefin mixture containing propylene and at least one another α-olefin comonomer in a gas phase or a liquid phase in the presence of a Ziegler-Natta catalyst under conditions of −10° C. to 50° C. and 0.1-10.0 MPa to obtain a propylene prepolymer, wherein pre-polymerization multiplication is controlled within the scope ranging from 2 to 3000 g polymer/g catalyst, such as from 3 to 2000 g polymer/g catalyst;

(2) performing a homopolymerization of propylene or copolymerization of propylene and at least one another α-olefin comonomer in a gas phase in the presence of the propylene prepolymer as obtained in step (1) under conditions of 91-150° C., such as 91-130° C. and further such as 91-110° C., and of 1-6 MPa to obtain a propylene polymer, wherein the polymerization time ranges from 0.5 h to 4 h;

(3) continuing the homopolymerization or copolymerization of propylene in a gas phase or a liquid phase in the presence of the product as obtained in step (2) under conditions of 50-150° C. and 1-6 MPa.

In addition, further disclosed herein is a propylene homopolymer and a copolymer of propylene and at least one another α-olefin comonomer which are prepared by the method for polymerization of propylene disclosed herein.

As disclosed herein, the term "pre-polymerization multiplication" refers to a ratio of prepolymer weight to solid catalyst component weight as originally added. Generally, as for the intermittent pre-polymerization, pre-polymerization multiplication can be calculated from dividing the weight of prepolymer as directly measured by the weight of catalyst as added; as for the continuous pre-polymerization, pre-polymerization multiplication can be indirectly controlled by regulating the residence time and polymerization temperature of the reaction. For different catalysts, different polymerization temperatures, different polymerization manners (gas phase, liquid phase bulk, etc.) and different polymerization pressures, pre-polymerization multiplications could be different even if the same residence time in pre-polymerization might be used, and could be obtained by integral computation according to reaction kinetic curve of catalyst.

As disclosed herein, the phrase "weight ratio of the reacted polymers in steps (2) and (3)" refers to a ratio of the weight of polymers generated in step (2) to the weight of polymers generated in step (3). According to the present disclosure, although the weight ratio of the polymers in steps (2) and (3) is not specifically limited, the weight ratio of the polymers in steps (2) and (3) may be, for example, ranging from 0.3:1 to 3:1, further for example, from 0.5:1 to 2:1, even further for example, from 1.0:1 to 2.0:1, such as from 0.8:1 to 1.5:1, in view of isotacticity and melt flow rate of propylene copolymer.

According to the present disclosure, the melt flow rate MFR of the polymer is measured according to ISO 1133 under conditions of 230° C. and 2.16 kg of load.

In the method according to the present disclosure, the steps can be performed in one reactor for batch polymerization operation, or performed in different reactors for continuation polymerization operation.

In some embodiments disclosed herein, in step (1), the pre-polymerization temperature is controlled within the scope ranging from −10° C. to 50° C., for example from 0° C. to 30° C., further for example from 10° C. to 25° C. The pre-polymerization pressure ranges from 0.1 MPa to 10.0 MPa, for example, from 1.0 MPa to 6.0 MPa, further for example, from 1.5 MPa to 5.5 MPa. The reaction time of this step depends on the desired degree of pre-polymerization, which for example can range from 8 min to16 min, such as from 10 min to 14 min.

According to the present disclosure, the phase state of propylene in the pre-polymerization of step (1) is not particularly limited, and the pre-polymerization can be performed in either gas phase or liquid phase. For example, the pre-polymerization in step (1) is carried out in liquid phase, such as in a liquid phase bulk pre-polymerization. During the liquid phase bulk pre-polymerization, a full kettle operation can be employed and pre-polymerization multiplication can be controlled with the residence time and reaction temperature, so that a continuous operation can be readily realized to reduce the operation cost. In this process, the pre-polymerization multiplication ranges, for example, from 2 to 3000 g polymer/g catalyst, such as from 3 to 2000 g polymer/g catalyst, further such as from 3 to 1000 g polymer/g catalyst.

In some embodiments disclosed herein, in step (2), the polymerization is carried out in the presence of the prepolymer as obtained in step (1), wherein the polymerization temperature ranges from 91° C. to 150° C., for example from 91° C. to 130° C., further for example from 91° C. to 110° C. and even further for example from 91° C. to 105° C., and the polymerization pressure ranges from 1 to 6 MPa, for example from 2 to 4 MPa, further for example from 2 to 3 MPa. The reaction time can be controlled within the scope ranging, for example, from 40 to 90 min, further for example from 50 to 70 min. In this step, a gas phase homopolymerization of propylene, for example, is carried out.

The reaction can be carried by gas phase polymerization process, and can be carried in one reaction kettle or a plurality of reaction kettles in series. Although the type of reaction kettle is not specifically limited, the gas phase polymerization is, for example, carried out in a gas phase horizontal reaction kettle. The horizontal reaction kettle has a horizontal agitating shaft and uses quench liquid to remove heat. According to the reaction mass and heat transfer property as well as the physiochemical parameters of propylene polymers, the gas phase horizontal reaction kettle is controlled with a stirring speed ranging from 10 to 150 rpm, for example, from 10 to 100 rpm, and further for example, from 20 to 50 rpm. The shape of the agitating blade can be, for example, T-shape, rectangle shape, inclined paddle, door type, wedge-shape and a combination thereof. The polymerization reaction time or residence time ranges, for example, from 0.5 to 4 h. The melt index of the polymer can be regulated with a molecular eight regulator. Under polymerization conditions of step (2), the resulting polymer has MFR of 10-2000 g/10 min, such as 15-1000 g/10 min, further such as 20-1000 g/10 min, and even further such as 30-500 g/10 min.

In some embodiments disclosed herein, as for the polymerization in step (3), in the presence of the product as obtained in step (2), the propylene homopolymerization or copolymerization proceeds in a gas phase at 55-110° C. and under the reaction pressure of, for example, 1.5-4 MPa, and further for example, 1.5-2.5 MPa, wherein the reaction time can be 30-90 min, such as 35-45 min. In the present disclosure, the polymerization temperature of step (3) is, for example, controlled substantively lower than the polymerization temperature of step (2).

According to the present disclosure, the copolymerization of propylene and at least one another α-olefin comonomer can be, for example, carried out in step (3). Although the type of α-olefin is not specifically limited in the present disclosure and various α-olefins capable of copolymerizing with propylene in the art can be used in the present disclosure, the at least one another α-olefin is, for example, selected from ethylene, butylene and hexylene, for example, ethylene. The amount of the at least one another α-olefin comonomer is not specifically limited either, but the at least one another α-olefin comonomer, such as ethylene, is used in an amount ranging from 4 wt % to 40 wt %, for example, from 6 wt % to 30 wt %, relative to the weight of the propylene homopolymer obtained in step (2).

The weight ratio of the polymers obtained in steps (2) and (3) ranges, for example, from 0.3:1 to 3.0:1. In the polymerization method of the present disclosure, the weight ratio of the polymers obtained in step (2) and step (3) is, for example, equal to or greater than 1, such as ranging from 1.0:1 to 2.0:1. After the polymerization of step (3), the resulting polymer can have a melt flow rate MFR ranging from 1 to 500 g/10 min, such as from 5 to 300 g/10 min, further such as from 8 to 200 g/10 min, and even further such as from 10 to 150 g/10 min.

In the polymerization method of the present disclosure, the Ziegler-Natty catalyst can be any Ziegler-Natty catalyst as known in the art. For example, the catalyst comprises a reaction product of the following components:

(1) at least one titanium-containing solid catalyst component;
(2) at least one alkyl aluminum compound; and
(3) optionally, at least one external electron donor component.

The component (1) is a reaction product of contacting at least one alkoxy magnesium compound, at least one titanium compound and at least one internal electron donor compound.

The at least one titanium compound is selected from compounds of formula: $Ti(OR)_{4-n}X_n$, wherein R is selected from $C_1$-$C_{14}$ aliphatic hydrocarbon group or aromatic hydrocarbon group (e.g., $C_7$-$C_{14}$ aromatic hydrocarbon group), X is halogen atom, n is an integer from 0 to 4; and in case of n being equal to or less than 2, the existing R groups can be identical or different. The halogen atom can be chlorine, bromine or iodine.

For example, the at least one titanium compound is selected from tetraalkoxy titanium, titanium tetrahalide, alkoxy titanium trihalide, dialkoxy titanium dihalide and trialkoxy titanium monohalide. More specifically, the at least one tetraalkoxy titanium is selected, for example, from tetramethoxy titanium, tetraethoxy titanium, tetra-n-propoxy titanium, tetra-iso-propoxy titanium, tetra-n-butoxy titanium, tetra-iso-butoxy titanium, tetra-cyclohexyloxy titanium, and tetraphenoxy titanium;

In one embodiment, the at least one titanium tetrahalide is selected from titanium tetrachloride, titanium tetrabromide, and titanium tetraiodide;

The at least one alkoxy titanium trihalide is selected, for example, from methoxy titanium trichloride, ethoxy titanium trichloride, propoxy titanium trichloride, n-butoxy titanium trichloride, and ethoxy titanium tribromide;

The at least one dialkoxy titanium dihalide is selected, for example, from dimethoxy titanium dichloride, diethoxy titanium dichloride, di-n-propoxy titanium dichloride, di-iso-propoxy titanium dichloride, and diethoxy titanium dibromide;

The at least one trialkoxy titanium monohalide is selected, for example, from trimethoxy titanium monochloride, triethoxy titanium monochloride, tri-n-propoxy titanium monochloride, and tri-iso-propoxy titanium monochloride.

In some embodiments, the at least one titanium compound is titanium tetrahalide. In other embodiments, the at least one titanium compound is titanium tetrachloride.

The at least one internal electron donor compound is selected, for example, from alkyl esters of aliphatic and aromatic monocarboxylic acids, alkyl esters of aliphatic and aromatic polycarboxylic acids, aliphatic ethers, cycloaliphatic ethers and aliphatic ketones. In some embodiments, the at least one internal electron donor compound is selected from alkyl esters of $C_1$-$C_4$ saturated aliphatic carboxylic acids, alkyl esters of $C_7$-$C_8$ aromatic carboxylic acids, $C_2$-$C_6$ aliphatic ethers, $C_3$-$C_4$ cyclic ethers, $C_3$-$C_6$ saturated aliphatic ketones, and 1,3-diether compounds.

In some embodiments, the at least one internal electron donor compound can be selected from phthalic acid ester compounds of formula (III),

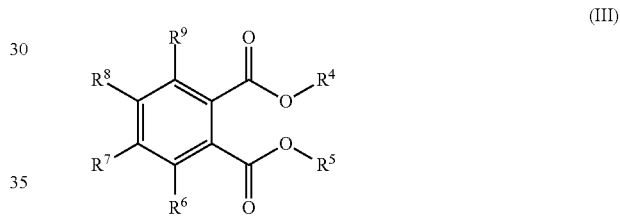

In formula (III), $R^4$ and $R^5$, which are identical or different, independently from each other, are $C_1$-$C_{12}$ straight or branched alkyl, $C_3$-$C_{10}$ cyclic alkyl, $C_6$-$C_{20}$ alkylaryl, or optionally substituted aryl;

$R^6$, $R^7$, $R^8$ and $R^9$ are hydrogen, or three of them are hydrogen, and the other one is one selected from halogen, straight or branched alkyl with 1-4 carbon atoms, and straight or branched alkoxy with 1-4 carbon atoms.

The at least one compound of formula (III) is selected, for example, from diethyl phthalate, di-n-butyl phthalate, di-isobutyl phthalate, dihexyl phthalate, diheptyl phthalate, and di-isooctyl phthalate. In some embodiments, the at least one compound of formula (III) is diethyl phthalate.

The at least one internal electron donor compound can be also selected, for example, from 1,3-diether compounds of formula (IV),

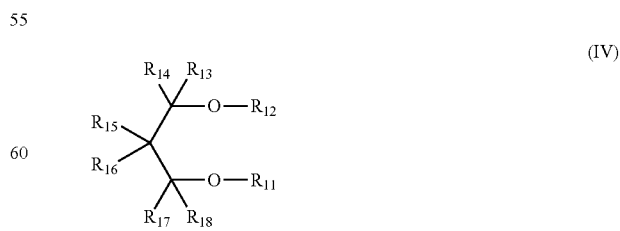

In formula (IV), $R_{11}$ and $R_{12}$, which are identical or different, independently from each other, are selected from $C_1$-$C_{20}$ straight, branched and cyclic aliphatic groups;

$R_{13}$, $R_{14}$, $R_{15}$, $R_{16}$, $R_{17}$ and $R_{18}$, which are identical or different, independently from each other, are selected from hydrogen, halogen atoms and straight or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl, and optionally two or more of groups $R_{13}$ to $R_{18}$ can be bonded each other to form a ring.

For example, $R_{11}$ and $R_{12}$, which are identical or different, are independently selected from $C_1$-$C_6$ straight and branched alkyl; $R_{15}$ and $R_{16}$, which are identical or different, are independently selected from straight and branched $C_1$-$C_{10}$ alkyl, and $C_3$-$C_{10}$ cycloalkyl.

The at least one diether compound of Formula (IV) can be but not limited to:
2-isopropyl-2-isopentyl-1,3-dimethoxypropane, 9,9-di(methoxymethyl)fluorene, 2-isobutyl-2-isopropyl-1,3-dimethoxypropane, 2,2-dicyclopentyldimethoxypropane, 2,2-diphenyl-1,3-dimethoxypropane, 2-isobutyl-2-isopropyl-1,3-dimethoxypropane, 2,2-dicyclopentyl-1,3-dimethoxypropane, 2,2-diisobutyl-1,3-dimethoxypropane and the like.

The at least one alkoxy magnesium is, for example, selected from the compounds of formula (II): $Mg(OR^1)_{2-m}(OR^2)_m$, wherein $R^1$ and $R^2$ are, identical or different, independently selected from $C_1$-$C_8$ straight and branched alkyl, and $0 \leq m \leq 2$.

For example, $R^1$ and $R^2$ in formula (II) are independently from each other selected from methyl, ethyl, propyl, isopropyl, butyl, isobutyl, n-hexyl, and (2-ethyl)hexyl; further for example, $R^1$ is ethyl, $R^2$ is (2-ethyl)hexyl, and $0.001 \leq m \leq 0.5$. It should be pointed out that the at least one alkoxy magnesium represented by this formula merely shows the composition of various alkoxy groups, i.e. their molar ratio, but does not illustrate the exact specific structure of alkoxy magnesium.

The at least one alkoxy magnesium compound has a sphere-like shape and an average particle size (D50) of 10-150 μm, such as 15-100 μm, further such as 18-80 μm. In addition, its particle size distribution index SPAN is <1.1, such as <1.05, wherein SPAN is calculated by the following formula:

$$SPAN = (D90 - D10)/D50 \quad (V)$$

In formula (V), D90 represents a particle diameter corresponding to a cumulative weight fraction of 90%, D10 represents a particle diameter corresponding to a cumulative weight fraction of 10%, and D50 represents a particle diameter corresponding to a cumulative weight fraction of 50%.

The at least one alkoxy magnesium compound according to the present disclosure can be prepared by reaction of magnesium metal, alcohols corresponding to the alkoxy groups of formula (II) and mixed halogenating agent in an inert atmosphere under refluxing, wherein the molar ratio of magnesium metal to halogen atoms in the mixed halogenating agent ranges, for example, from 1:0.0002 to 1:0.2, such as from 1:0.001 to 1:0.08; the weight ratio of alcohol to magnesium ranges, for example, from 4:1 to 50:1, such as from 6:1 to 25:1. The reaction temperature ranges, for example, from 0° C. to the refluxing temperature of the reaction system. In some embodiments, the reaction temperature is the refluxing temperature of the reaction system. The reaction time ranges from 2 h to 30 h.

The mixed halogenating agent is a combination of the halogen and halogen compound, which are selected from, for example, iodine, bromine, chlorine, magnesium chloride, magnesium bromide, magnesium iodide, potassium chloride, potassium bromide, potassium iodide, calcium chloride, calcium bromide, calcium iodide, mercuric chloride, mercuric bromide, mercuric iodide, ethoxy magnesium iodide, methoxy magnesium iodide, isopropoxy magnesium iodide, hydrogen chloride, and chloroacetyl chloride, etc. The mixed halogenating agent is, in some embodiments, a combination of iodine and magnesium chloride. The weight ratio of iodine to magnesium chloride ranges, for example, from 1:0.02 to 1:20, such as from 1:0.02 to 1:10, further such as from 1:0.05-1:20, even further such as from 1:0.1 to 1:10.

The inert atmosphere includes, for example, nitrogen gas atmosphere and/or argon gas atmosphere. In some embodiments, the inert atmosphere is nitrogen gas atmosphere.

The titanium-containing solid catalyst component according to the present disclosure can be prepared by a method comprising:
reacting the at least one alkoxy magnesium with the at least one internal electron donor compound and the at least one titanium compound in the presence of at least one inert diluent; and
washing the solid obtained in the reaction with at least one inert diluent to yield the catalyst solid component.

In this method, for example, the amount of the at least one titanium compound used, expressed in molar ratio to magnesium in the at least one alkoxy magnesium compound, is (0.5-100):1, such as (1-50):1, and the amount of the at least one electron donor compound used, expressed in molar ratio to magnesium in the at least one alkoxy magnesium compound, is (0.005-10):1, such as (0.01-1):1. The amount of the at least one inert diluent, expressed in molar ratio to magnesium in the at least one alkoxy magnesium compound, is (0.5-100):1, such as (1-50):1. The reaction temperature ranges, for example, from −40° to 200° C., such as from −20° C. to 150° C., and the reaction time ranges from 1 min to 20 h, such as from 5 min to 8 h. The at least one inert diluent can be selected, for example, from C6-C10 alkane or arene, such as hexane, heptane, octane, decane, benzene, toluene, xylene and derivatives thereof, such as toluene.

In the preparation of the catalyst solid component according to the present disclosure, the order of adding the at least one alkoxy magnesium, the at least one internal electron donor compound, the at least one inert diluent and the at least one titanium compound is not specifically limited. For example, these components can be mixed in the presence of the inert diluent, or they can be diluted with the at least one inert diluent in advance and then mixed. It is not specifically limited either for how much times these components are mixed, and thus the mixing process can be performed, for example, once or several times.

The component (2) of the catalyst of the present disclosure is at least one alkyl aluminum compound of formula (VI), $$AlR^{10}{}_n X_{3-n} \quad (VI)$$

in which $R^{10}$ is hydrogen or a hydrocarbon group with 1-20 carbon atoms, X is halogen and n is a number of $1 \leq n \leq 3$. The at least one compound of formula (VI) can be selected, for example, from triethyl aluminum, tripropyl aluminum, tri-n-butyl aluminum, tri-iso-butyl aluminum, tri-n-octyl aluminum, diethyl aluminum monohydride, di-iso-butyl aluminum monohydride, diethyl aluminum monochloride, di-iso-butyl aluminum monochloride, ethyl aluminum sesquichloride, and ethyl aluminum dichloride, such as from triethyl aluminum and tri-iso-butyl aluminum.

In the catalyst according to the present disclosure, the at least one external electron donor component can be any of external electron donors known in the art, and thus is not specifically limited. It is, for example, the organosilicon compound of formula (VII),

in which $R^{1''}$ and $R^{2''}$ are, identical or different, independently selected from halogen, hydrogen atom, $C_1$-$C_{20}$ alkyl, $C_3$-$C_{20}$ cycloalkyl, $C_6$-$C_{20}$ aryl and $C_1$-$C_{20}$ halogenated alkyl; $R^{3''}$ is, on each occurrence and independently from each other, $C_1$-$C_{20}$ alkyl, $C_3$-$C_{20}$ cycloalkyl, $C_6$-$C_{20}$ aryl, or $C_1$-$C_{20}$ halogenated alkyl; each of m'' and n'' is independently an integer of 0-3, and m''+n''<4.

The non-limiting examples of the organosilicon compound of formula (VII) can be trimethylmethoxysilane, diisopropyldimethoxysilane, diisobutyldimethoxysilane, isopropylisobutyldimethoxysilane, di-tert-butyldiethoxysilane, tert-butylmethyldimethoxysilane, tert-butylethyldimethoxysilane, tert-butylpropyldimethoxysilane, tert-butylisopropyldimethoxysilane, cyclohexylmethyldimethoxysilane, dicyclohexyldimethoxysilane, cyclohexyl-tert-butyldimethoxysilane, cyclopentylmethyldimethoxysilane, cyclopentylethyldimethoxysilane, dicyclopentyldimethoxysilane, cyclopentylcyclohexyldimethoxysilane, di(2-methylcyclopentyl)dimethoxysilane, diphenyldimethoxysilane, diphenyldiethoxysilane, phenyltriethoxysilane, methyltrimethoxysilane, methyltriethoxysilane, ethyltrimethoxysilane, propyltrimethoxysilane, isopropyltrimethoxysilane, butyltrimethoxysilane, butyltriethoxysilane, isobutyltrimethoxysilane, pentyltrimethoxysilane, isopentyltrimethoxysilane, cyclopentyltrimethoxysilane, cyclohexyltrimethoxysilane, diphenyldimethoxysilane, diphenyldiethoxysilane, phenyltrimethoxysilane, phenyltriethoxysilane, n-propyltrimethoxysilane, vinyltrimethoxysilane, tetramethoxysilane, tetraethoxysilane, tetrabutoxysilane etc. These organosilicon compounds can be used solely or in combination of two or more thereof. In some embodiments, the at least one external electron donor is chosen from dicyclopentyldimethoxysilane, diisopropyldimethoxysilane, diisobutyldimethoxysilane, cyclohexylmethyldimethoxysilane, diphenyldimethoxysilane, methyltertbutyldimethoxysilane and tetraethoxysilane.

In the catalyst of the present disclosure, the molar ratio of compound (2) to component (1), i.e., the molar ratio of the at least one alkyl aluminum to the solid catalyst component, expressed in Al/Ti, ranges from 20:1 to 500:1, such as from 25:1 to 100:1. The molar ratio of component (2) to component (3), expressed in Al/Si, ranges from 1:1 to 200:1, such as from 3:1 to 100:1.

In addition, further disclosed herein is a propylene polymer as prepared by the method as disclosed herein. The elevation of the polymerization temperature in step (2) can result in propylene polymers with both high fluidity and high rigidity. Such propylene polymer articles with high fluidity and high rigidity have the following advantages: for example, as for the injection molding articles, the increase of fluidity can produce articles with more complicated structure; and due to the increased rigidity, the thickness of articles can be reduced so as to reduce the production cost. In the meantime, the polymerization method of the present disclosure uses a specific type of catalyst, which still has a relatively high polymerization activity when used at a higher polymerization temperature even after the pre-polymerization. Hence, the present disclosure can be very promising in the industrial application.

EXAMPLES

The present disclosure is further illustrated in conjunction with the following examples, which are used for illustration rather than limiting the present disclosure.

Measurement Methods:

1. Titanium content in the catalyst was measured by using 721 spectrophotometer.
2. Particle size and particle size distribution of the at least one alkoxy magnesium and the catalyst were measured by using Malvern Mastersizer™ 2000 laser diffraction method with n-hexane used as dispersing agent (in which, SPAN=(D90−D10)/D50).
3. Measurement of 2-ethylhexyloxy magnesium in the support: 1N hydrochloric acid solution was added to the obtained sample, stirred for 24 h for degradation, and the 2-ethylhexanol therein was quantified by gas chromatography and then calculation.
4. Measurement of m value of the support: 0.1 g of support was taken up, added with 10 ml of 1.2 mol/l hydrochloric acid aqueous solution, then shaken for 24 h for degradation. The ethanol and 2-ethylhexanol therein were quantified by gas chromatography and then m value was calculated by the following formula:

$$m = \frac{2(w1 \times 46.07)}{w2 \times 130.23 + w1 \times 46.07}$$

wherein w1 is the mass of 2-ethylhexanol, and w2 is the mass of ethanol.
5. The content of the at least one internal electron donor in the olefin polymerization catalyst component was measured by using Waters 600E liquid chromatograph or gas chromatograph.
6. Stereo regularity index (Isotacticity) was measured according to National Standard GB2412.
7. Melt flow rate (MFR) was measured according to ISO1133 under 230° C. and 2.16 kg of load.
8. Tensile strength of resin was measured according to ASTM D638-00.
9. Flexural Modulus of resin was measured according to ASTM D790-97.
10. Izod impact strength was measured according to ASTM D256-00.

Preparation Example 1

In this preparation example, the catalyst solid component used in the method for preparing propylene copolymer of the present disclosure was prepared.

In a 16 L pressure-resistant reactor with a stirrer that was sufficiently purged with nitrogen gas, 10 L of ethanol, 300 mL of 2-ethylhexanol, 11.2 g of iodine, 8 g of magnesium chloride and 640 g of magnesium powder were added. Under stirring, the system was heated for refluxing until no more hydrogen gas was discharged. The reaction was terminated, and 3 L of ethanol was used for washing. The dialkoxy magnesium support was obtained after filtration and drying. The dialkoxy magnesium support had D50=30.2 μm, Span value of 0.81, m value of 0.015.

650 g of the dialkoxy magnesium support and 3250 mL of toluene were formulated to form a suspension. In a 16 L pressure-resistant reactor that was repeatedly purged with high purity nitrogen gas, 2600 mL of toluene and 3900 mL of titanium tetrachloride were added and heated to 80° C. Then the formulated suspension was added to the reactor, kept at the temperature for 1 h. After adding 130 mL of diethyl phthalate, the temperature was slowly raised to 110° C. and then kept for further 2 h. A solid was obtained by press-filtration. The obtained solid was added to a mixed liquid of 5070 mL of toluene and 3380 mL of titanium tetrachloride and then treated under stirring at 110° C. for 1 h. Such a treatment was repeated for 3 times. After press-filtration, the obtained solid was washed with hexane for 4 times, 6000 mL per wash. The main catalyst solid component was finally obtained after press-filtration and drying. The obtained catalyst solid component had the content of the titanium atom of 2.4 wt %, and had diethyl phthalate in an amount of 10.5%.

Example 1

This example is to illustrate the propylene copolymer and preparation method thereof as disclosed herein.

The experiment used the polymerization process comprising a continuous pre-polymerization kettle in gaseous connection in series with two horizontal kettles. The pre-polymerization kettle had a volume of 5 L and was a vertical agitation kettle with jacket cooling device. The stirring paddle was turbine type inclined paddle, and the stirring speed was 500 rpm. The two horizontal gas phase reaction kettle that were of the same structure had a volume of 0.2 m³ and was a horizontal agitation kettle with the stirring paddle being T type inclined paddle and having an inclination angle of 10°. The stirring speed was 100 rpm. The gas phase homopolymerization of propylene in step (2) and the gas phase copolymerization of propylene and ethylene in step (3) were carried out respectively in two horizontal gas phase reaction kettle.

Pre-polymerization of step (1): reaction pressure was 2.5 MPa, reaction temperature was 10° C., reaction time was 12 minutes. The solid component as prepared in Preparation Example 1 was fed in a rate of 0.9 g/h, triethyl aluminum was fed in a rate of 0.072 mol/h, a mixture of dicyclopentyldimethoxysilane and tetraethoxysilane (1:4 mol/mol) was fed in a rate of 0.012 mol/h. Al/Si (mol/mol)=6.0; and the propylene was fed in a rate of 10 kg/h. The pre-polymerization multiplication was about 80.

Gas phase homopolymerization of propylene in step (2): reaction temperature was 95° C., reaction pressure was 2.3 MPa and reaction time was 60 minutes. The propylene was fed in a rate of 30 kg/h, the hydrogen gas was fed in a rate of 1.1 g/h, and the molar ratio of hydrogen gas/propylene in the reaction gas phase was 0.02:1.

Gas phase copolymerization of propylene and ethylene in step (3): reaction temperature was 66° C., reaction pressure was 2.3 MPa, and reaction time was 40 min. The ethylene was fed in a rate of 7 kg/h, the propylene was fed in a rate of 30 kg/h and the hydrogen gas was fed in a rate of 0.5 g/h. The molar ratio of hydrogen gas/propylene in the reaction gas phase was 0.01:1 and the molar ratio of ethylene/propylene in the gas phase of the reaction system was 0.35:1.

The experiment was continuously performed for 48 h under the conditions of Example 1, and the operation of device was stable. In the continuous experimental process, polymers in certain amounts were taken out from the reaction kettles of stages (2) and (3) and analyzed. The re its were shown in Table 1.

Example 2

This example is to illustrate the propylene copolymer and preparation method thereof as disclosed herein.

The experiment used the polymerization process comprising a continuous pre-polymerization kettle in gaseous connection in series with two horizontal kettles. The pre-polymerization kettle had a volume of 5 L and was a vertical agitation kettle with jacket cooling device. The stirring paddle was turbine type inclined paddle, and the stirring speed was 500 rpm. The horizontal gas phase reaction kettle had a volume of 0.2 m³ and was a horizontal agitation kettle with the stirring paddle being T type inclined paddle and having an inclination angle of 10°. The stirring speed was 100 rpm.

Pre-polymerization of step (1): reaction pressure was 2.5 MPa, reaction temperature was 10° C. and reaction time was 12 minutes. The solid component as prepared in Preparation Example 1, triethyl aluminum, diisobutyldimethoxysilane (DIBDMS) were fed in a rate of 1.1 g/h, 0.088 mol/h and 0.015 mol/h, respectively; Al/Si (mol/mol)=6.1. The propylene was fed in a rate of 10 kg/h.

Gas phase homopolymerization of propylene in step (2): reaction temperature was 95° C., reaction pressure was 2.3 MPa and reaction time was 60 minutes. The propylene was fed in a rate of 30 kg/h, the hydrogen gas was fed in a rate of 1.7 g/h, and the molar ratio of hydrogen gas/propylene was 0.03:1.

Gas phase copolymerization of propylene and ethylene in step (3): reaction temperature was 66° C., reaction pressure was 2.3 MPa, and reaction time was 40 min. The ethylene was fed in a rate of 7 kg/h, the propylene was fed in a rate of 30 kg/h and the hydrogen gas was fed in a rate of 0.5 g/h. The molar ratio of hydrogen gas/propylene in the reaction gas phase was 0.01:1, and the molar ratio of ethylene/propylene in the gas phase of the reaction system was 0.35:1.

The experiment was continuously performed for 48 h, and the operation of device was stable. In the continuous experimental process, polymers in certain amounts were taken out from reaction kettles of stages (2) and (3) and analyzed. The results were shown in Table 1.

Comparison Example 1

Example 2 was substantively repeated with the exception that the operation conditions for gas phase polymerization in step (2) were: reaction temperature was 66° C., reaction pressure was 2.3 MPa and reaction time was 60 min. The propylene was fed in a rate of 30 kg/h, the hydrogen gas was fed in a rate of 1.7 g/h and the molar ratio of hydrogen gas/propylene in the gas phase was 0.03:1.

The experiment was continuously performed for 48 h, and the operation of device was stable. In the continuous experimental process, polymers in certain amounts were taken out from reaction kettles of stages (2) and (3) and analyzed. The results were shown in Table 1.

TABLE 1

| | Properties of polymer samples | | | |
|---|---|---|---|---|
| Items | Example 1 | Example 2 | Comparison Example 1 | K7726* |
| Gas polymerization temperature of stage (2), ° C. | 95 | 95 | 66 | — |
| Molar ratio of $H_2$/propylene in the reaction kettle of stage (2), mol/mol | 0.02 | 0.03 | 0.03 | — |

TABLE 1-continued

Properties of polymer samples

| Items | Example 1 | Example 2 | Comparison Example 1 | K7726* |
|---|---|---|---|---|
| Melt flow rate of the propylene homopolymer of stage (2), g/10 min | 96 | 119 | 34 | — |
| Molar ratio of H$_2$/propylene in the reaction kettle of stage (3), mol/mol | 0.01 | 0.01 | 0.01 | — |
| Melt flow rate of the propylene copolymer of state (3), g/10 min | 29.1 | 50 | 14 | 27.1 |
| Ethylene content in the propylene copolymer, wt % | 7.4 | 7.6 | 7.4 | 7.2 |
| Tensile strength of the propylene copolymer, MPa | 35 | 29 | 37 | 25.4 |
| Flexural modulus of the propylene copolymer, MPa | 1330 | 1300 | 1350 | 1300 |
| Bending strength of the propylene copolymer, MPa | 34 | 30 | 33 | 30.7 |
| Izod impact strength of the propylene copolymer, 23 J · m$^{-1}$ | 70 | 67 | 78 | 68 |

K7726* was an impact resistant copolymer product K7726 that was commercially available product from Yanshan Petrochemical Company. This product was obtained by peroxide degradation to increase melt index of the product, and an amount of nucleating agent was added to improve the rigidity of product.

By comparing Example 1 with K7726*, it can be seen that the method as disclosed herein could lead to a high melt index product without using the peroxide and nucleating agent, and the obtained propylene copolymer has the rigidity and toughness comparable to the level of products containing the nucleating agent in the market. By comparing Example 2 with Comparison Example 1, it can be seen that the difference between them lies in the reaction temperature of step (2), i.e. the temperature of Example 2 was 95° C., while the polymerization temperature of Comparison Example 1 was 66° C. as conventionally used. Example 2 could lead to an impact resistant propylene copolymer with melt index of 50 g/min, while Comparison Example 1 could merely lead to an impact resistant propylene copolymer with melt index of 14 g/min.

Therefore, the method as disclosed herein could yield a propylene copolymer product with high melt flow index, improved rigidity and impact resistance.

Example 3

1) Raw Materials

Diisobutyldimethoxysilane was used as the at least one external electron donor, and other conditions were the same as Example 1.

2) Experimental Equipment

Identical to Example 1

3) Experimental Conditions

Pre-polymerization of step (1): reaction pressure was 2.5 MPa, reaction temperature was 10° C. and reaction time was 12 minutes. The catalyst, triethyl aluminum, diisobutyldimethoxysilane (DIBDMS) were fed in a rate of 0.6 g/h, 0,048 mol/h (8 ml/h) and 0.0078 mol/h (2.7 ml/h), respectively; Al/Si (mol/mol)=6.11. The propylene was fed in a rate of 10 kg/h.

Gas phase homopolymerization of propylene in step (2): reaction temperature was 95° C., reaction pressure was 2.3 MPa and reaction time was 60 minutes. The propylene was fed in a rate of 30 kg/h, the hydrogen gas was fed in a rate of 1.6 g/h and the molar ratio of hydrogen gas/propylene in the reaction gas phase was 0.03.

Gas phase copolymerization of propylene and ethylene in step (3): reaction temperature was 66° C., reaction pressure was 2.3 MPa and reaction time was 40 min. The ethylene was fed in a rate of 7 kg/h, the propylene was fed in a rate of 30 kg/h and the hydrogen gas was fed in a rate of 0.5 g/h. The molar ratio of hydrogen gas/propylene in the gas phase was 0.01 and the molar ratio of ethylene/propylene in the gas phase was 0.35.

4) Experimental Results

The experiment was continuously performed for 48 h according to the above conditions, and the operation of equipment was stable. The polymer obtained by reactions was analyzed and the results were shown in Table 2.

Comparison Example 2

1) Raw Materials

Except that tetraethoxysilane was used as an external electron donor, other conditions were the same as Example 1.

It should be pointed out that the obtained polymer should have comparable melt flow rate so as to compare with the polymer of Example 3 in mechanical properties. If Comparison Example 2 used the same external electron donor (diisobutyldimethoxysilane) as Example 3, it could be impossible to obtain a polymer with a melt flow rate comparable to that of Example 3, that is to say that a melt flow rate could not reach 55 (merely about 7 as can be seen in Comparison Example 3), in case that the reaction temperature in step (2) is 66° C. Under such circumstances, tetraethoxysilane, an external electron donor more sensitive to hydrogen regulation, was used.

2) Experimental Equipment

Identical to Example 3

3) Experimental Conditions

Pre-polymerization of step (1): reaction pressure was 2.5 MPa, reaction temperature was 10° C. and reaction time was 12 minutes. The catalyst, triethyl aluminum, tetraethoxysilane were fed in a rate of 0.5 g/h, 0.048 mol/h (8 ml/h) and 0.0078 mol/h (2.7 ml/h), respectively; Al/Si (mol/mol)=6.11. The propylene was fed in a rate of 10 kg/h.

Gas phase homopolymerization of propylene in step (2): except that the reaction temperature was 66° C., hydrogen gas was fed in a rate of 0.8 g/h and the molar ratio of hydrogen gas/propylene in the reaction gas phase was 0.015, other conditions were the same as that in Example 3.

Gas phase copolymerization of propylene and ethylene in step (3): the reaction conditions and operation were the same as that in Example 3.

4) Experimental Results

The experiment was continuously performed for 48 h according to the above conditions, and the operation of equipment was stable. The polymer obtained by reactions was analyzed and the results were shown in Table 2.

Comparison Example 3

Except that the polymerization temperature of the gas phase propylene homopolymerization in step (2) was 66° C., other conditions were the same as that in Example 3. The polymer obtained by reactions was analyzed and the results were shown in Table 2.

Comparison Example 4

1) Raw Materials

The used main catalyst was prepared according to Example 1 of Chinese Patent CN85100997, while other conditions were the same as that in Example 3.

2) Experimental Equipment

Identical to Example 3

3) Experimental Conditions

Identical to Example 3

4) Experimental Results

The experiment was continuously performed for 48 h according to the above conditions, and the operation of equipment was stable. The polymer obtained by reactions was analyzed and the results were shown in Table 2.

TABLE 2

Analysis results of polymers obtained in Example 2 and Comparison Example 2

|  | Example 3 | Comparison Example 2 | Comparison example 3 | Comparison example 4 |
| --- | --- | --- | --- | --- |
| Catalyst | According to the present invention | According to the present invention | According to the present invention | Catalyst component in the art |
| External electron donor in the catalyst | Diisobutyl-dimethoxysilane | Tetraethoxy-silane | Diisobutyl-dimethoxysilane | Diisobutyl-dimethoxysilane |
| Gas polymerization temperature of stage (2), | 95° C. | 66° C. | 66° C. | 95° C. |
| Molar ratio of $H_2$/propylene of stage (2) | 0.03 | 0.015 | 0.03 | 0.03 |
| Gas phase polymerization temperature of stage (3), | 66° C. | 66° C. | 66° C. | 66° C. |
| Molar ratio of $H_2$/propylene of stage (3) | 0.01 | 0.01 | 0.01 | 0.01 |
| Molar ratio of ethylene/propylene of stage (3) | 0.35 | 0.35 | 0.35 | 0.35 |
| Melt flow rate of the polymer, g/10 min | 55 | 53 | 7.6 | 35 |
| Ethylene content in the polymer, wt % | 7.0 | 7.1 | 7.0 | 7.0 |
| Tensile strength, MPa | 25.6 | 20.7 | — | — |
| Flexural modulus, GPa | 1.35 | 1.01 | — | — |
| Bending strength, MPa | 35 | 27.8 | — | — |
| IZOD impact strength, J/m 23° C. | 68 | 45 | — | — |
| Polymerization activity, kg polymer/g catalyst | 28 | 16 | 30 | 5.0 |

The data of Table 2 show that:

(1) Comparison of Example 3 and Comparison Example 3: with the same solid catalyst, the propylene polymer with high melt flow rate of the present disclosure could not be obtained if the temperature of step (2) is relatively low. Under the same conditions, the polymer obtained in Example 3 had a melt flow rate of 55, while that of Comparison Example 3 merely had a melt flow rate of 7.6.

(2) Comparison of Example 3 and Comparison Example 2: when the temperature of step (2) was relatively low, although a specific external electron donor in catalyst was used in Comparison Example 2 so as to obtain a propylene polymer with the melt flow rate comparable to that of Example 3, the polymer of Example 3 had the mechanical properties such as rigidity and toughness that were far superior to Comparison Example 2, and the polymerization activity was also much higher than Comparison Example 2.

(3) Comparison of Example 3 and Comparison Example 4: with a conventional catalyst in the art, the activity usually decreased to a very low level of only 5000 multiplication if the polymerization temperature of step (2) was relatively high. However, in the present invention, after the high-temperature polymerization in step (2), the copolymerization in step (3) was still of a relatively high polymerization activity.

The above data comparison shows that the elevation of polymerization temperature in step (2) can lead to a propylene polymer with both high fluidity and high rigidity. In particular, the catalyst composition of the present invention had a relatively high activity and thus is promising for the industrial applications.

What is claimed is:

1. A method for polymerization of propylene, comprising:
   (1) performing pre-polymerization of propylene or an olefin mixture containing propylene and at least one another α-olefin comonomer in a gas phase or a liquid phase in the presence of a Ziegler-Natta catalyst at a temperature ranging from −10° C. to 50° C. and under a pressure ranging from 0.1 MPa to 10.0 MPa to obtain a propylene prepolymer, wherein the pre-polymerization multiplication is controlled within the scope ranging from 2 to 3000 g polymer/g catalyst; wherein the Ziegler-Natta catalyst comprises a reaction product of the following components:
   (i) at least one titanium-containing solid catalyst component;
   (ii) at least one alkyl aluminum compound; and
   (iii) optionally, at least one external electron donor component,
   and wherein the at least one titanium-containing solid catalyst component of the component (i) is a reaction product of contacting at least one alkoxy magnesium compound, at least one titanium compound and at least one internal electron donor compound,
   wherein
   the at least one titanium compound is selected from compounds of formula: Ti(OR)$_{4-n}$X$_n$, in which R is selected from C$_1$-C$_{14}$ aliphatic or aromatic hydrocarbonyl group, X is a halogen atom, n is an integer from 0 to 4 and in case of n being equal to or less than 2, the existing R groups can be same or different;
   the at least one internal electron donor compound is selected from alkyl esters of aliphatic and aromatic monocarboxylic acids, alkyl esters of aliphatic and aromatic polycarboxylic acids, aliphatic ethers, cycloaliphatic ethers and aliphatic ketones; and
   the at least one alkoxy magnesium compound is selected from the compounds of formula Mg(OR$^1$)$_{2-m}$(OR$^2$)$_m$, wherein R$^1$ is ethyl, R$^2$ is (2-ethyl)hexyl, and 0.001≤m≤0.5;
   (2) performing a homopolymerization of propylene or copolymerization of propylene and at least one another α-olefin comonomer in a gas phase in the presence of the propylene prepolymer as obtained in step (1) under conditions of 91-150° C. and 1-6 MPa to obtain a propylene polymer, wherein the polymerization time ranges from 0.5 h to 4 h;
   (3) continuing the homopolymerization or copolymerization of propylene in a gas phase or a liquid phase in the presence of the product as obtained in step (2) under conditions of 50-150° C. and 1-6 MPa.

2. The method for polymerization of propylene according to claim 1, wherein the pre-polymerization multiplication is controlled within the scope ranging from 3 to 2000 g polymer/g catalyst.

3. The method for polymerization of propylene according to claim 1, wherein, in step (2), the temperature ranges from 91 to 130° C.

4. The method for polymerization of propylene according to claim 3, wherein, in step (2), the temperature ranges from 91 to 110° C.

5. The method for polymerization of propylene according to claim 1, wherein the individual steps are performed in one reactor for the batch polymerization operation, or performed in different reactors for continuation polymerization operation.

6. The method for polymerization of propylene according to claim 1, wherein in step (1), the pre-polymerization temperature ranges from 0 to 30° C. and the pre-polymerization pressure ranges from 1.0 to 6.0 MPa.

7. The method for polymerization of propylene according to claim 6, wherein, in step (1), the pre-polymerization temperature ranges from 10 to 25° C.

8. The method for polymerization of propylene according to claim 6, wherein, in step (1), the pre-polymerization pressure ranges from 1.5 to 5.5 MPa.

9. The method for polymerization of propylene according to claim 1, wherein the at least another α-olefin comonomer has the carbon atom number of 2 to 6 but not 3.

10. The method for polymerization of propylene according to claim 1, wherein the gas phase polymerization of propylene in step (2) is performed in a horizontal reaction kettle having a horizontal agitating shaft and a stirring speed of 10-150 rpm, in which the agitating blade is selected from T-shape, rectangle shape, inclined paddle, door shape, wedge-shape and any combination thereof, and the reaction kettle uses a quench liquid to remove heat.

11. The method for polymerization of propylene according to claim 1, wherein the polymer obtained in step (2) has a melt flow rate MFR of 20-1000 g/10 min, as measured according to ISO1133 under 230° C. and 2.16 kg load.

12. The method for polymerization of propylene according to claim 1, wherein the gas phase homopolymerization or copolymerization of propylene in step (3) is performed at the polymerization temperature of 55-110° C., and the polymer obtained in step (3) has a melt flow rate MFR of 1-500g/10min, as measured according to ISO1133 under 230° C. and 2.16 kg load.

13. The method for polymerization of propylene according to claim 1, wherein a liquid phase bulk pre-polymerization of propylene is performed at 0-30° C. in step (1); a gas phase homopolymerization of propylene is performed at 91-110° C. in step (2); and the gas phase homopolymerization or copolymerization of propylene is continued in the presence of the product as obtained in step (2) at 55-110° C. in step (3), wherein the weight ratio of the polymers obtained in steps (2) and (3) ranges from 0.3:1 to 3:1.

14. The method for polymerization of propylene according to claim 13, wherein the weight ratio of the polymers obtained in steps (2) and (3) ranges from 1.0:1 to 2.0:1.

15. The method for polymerization of propylene according to claim 1, wherein a homopolymerization of propylene is performed in steps (1) and (2), while a copolymerization of propylene and at least one another α-olefin comonomer is performed in step (3).

16. The method for polymerization of propylene according to claim 1, wherein the at least one another α-olefin comonomer is selected from ethylene, butylene and hexylene.

17. The method for polymerization of propylene according to claim 15, wherein in step (3) the copolymerization is performed using ethylene in an amount ranging from 4 to 40 wt % relative to the weight of propylene homopolymer as obtained in step (2).

18. The method for polymerization of propylene according to claim 17, wherein in step (3) the copolymerization is performed using ethylene in an amount ranging from 6 to 30 wt % relative to the weight of propylene homopolymer as obtained in step (2).

19. The method for polymerization of propylene according to claim 1, wherein $0.001 \leq m \leq 0.25$.

20. The method for polymerization of propylene according to claim 19, wherein $0.001 \leq m \leq 0.1$.

21. The method for polymerization of propylene according to claim 1, wherein the at least one internal electron donor compound is selected from alkyl esters of $C_1$-$C_4$ saturated aliphatic carboxylic acids, alkyl esters of $C_7$-$C_8$ aromatic carboxylic acids, $C_2$-$C_6$ aliphatic esters, $C_3$-$C_4$ cyclic ethers, $C_3$-$C_6$ saturated aliphatic ketones, and 1,3-diether compounds.

* * * * *